United States Patent
Van Lieshout

(10) Patent No.: US 6,462,488 B2
(45) Date of Patent: Oct. 8, 2002

(54) SHADOWMASKLESS TRACKING CATHODE RAY TUBE CONTROL CIRCUIT HAVING INVERSE BEAM CURRENT COMPENSATION

(75) Inventor: Petrus Johannes Gerardus Van Lieshout, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/781,381

(22) Filed: Feb. 12, 2001

(65) Prior Publication Data

US 2001/0017522 A1 Aug. 30, 2001

(30) Foreign Application Priority Data

Feb. 14, 2000 (EP) .............................................. 00200469

(51) Int. Cl.$^7$ ................................................. G09G 1/04
(52) U.S. Cl. ........................ 315/387; 315/371; 348/747
(58) Field of Search ............................ 315/10, 369–371, 315/382.1, 387, 364; 348/747, 805, 806

(56) References Cited

U.S. PATENT DOCUMENTS

| | | | | | |
|---|---|---|---|---|---|
| 3,735,029 | A | * | 5/1973 | Sunstein | 348/379 |
| 4,095,144 | A | * | 6/1978 | Mendelsohn | 313/470 |
| 4,159,484 | A | * | 6/1979 | Strathman | 348/806 |
| 4,456,853 | A | * | 6/1984 | Robinder et al. | 313/421 |
| 4,617,495 | A | * | 10/1986 | Culter | 315/10 |
| 4,636,843 | A | * | 1/1987 | Hosono et al. | 315/369 |
| 5,872,432 | A | * | 2/1999 | Beeteson | 315/382.1 |

FOREIGN PATENT DOCUMENTS

GB   1403061   8/1975

* cited by examiner

*Primary Examiner*—Haissa Philogene

(57) ABSTRACT

A shadowmaskless tracking cathode ray tube control circuit is described, comprising a control loop, which is coupled to a deflection unit of a shadowmaskless tracking cathode ray tube. The shadowmaskless tracking cathode ray tube control circuit further comprises a loop gain control means for compensating the loop gain of the control loop in dependence on the inverse value of the beam current in the shadowmaskless tracking cathode ray tube. The effect is that a constant loop gain is created, which is independent of the beam current.

7 Claims, 1 Drawing Sheet

SHADOWMASKLESS TRACKING CATHODE RAY TUBE CONTROL CIRCUIT HAVING INVERSE BEAM CURRENT COMPENSATION

BACKGROUND OF THE INVENTION

The present invention relates to a shadowmaskless tracking cathode ray tube control circuit comprising a control loop having a loop gain control means, which control loop is coupled to the shadowmaskless tracking cathode ray tube.

Such a shadowmaskless tracking cathode ray tube control circuit is known from GB-A-1 403 061. Disclosed therein is a shadowmaskless tracking cathode ray tube (CRT, also referred to as index tube) wherein a feedback control loop controls the exact landing spot of electron beams on a front plate thereof. The position of the spot is measured by using a conducting track structure or a sensor positioned on the inner side of the front plate. When a spot is scanned along the tracks, a tracking signal which depends on the spot position is produced, which tracking signal can be used to generate, in a loop, a spot position output signal for a deflection unit on the shadowmaskless tracking CRT, which keeps the spot on track. It has been found that the accuracy of the measurement is proportional to the loop gain and that its stability is inversely proportional to the loop gain. The loop gain depends on the beam current. This means that the loop gain has to be chosen in such a way that the stability will be sufficient in light areas on the screen. This is, however, disadvantageous for the accuracy in darker areas on the screen.

SUMMARY OF THE INVENTION

Therefore, it is an object of the present invention to provide a control loop circuit having an enhanced loop stability/accuracy balance under various light and dark circumstances on the CRT screen.

To this end, the shadowmaskless tracking cathode ray tube control circuit according to the invention is characterized in that the loop gain control means is arranged to compensate the loop gain of the control loop in dependence on the inverse value of a beam current in the cathode ray tube.

A compensation as thus proposed in the shadowmaskless tracking CRT circuit according to the present invention advantageously reveals a constant loop gain, which is independent of the beam current. The loop gain may at wish be optimized for improved stability and/or improved accuracy of the shadowmaskless tracking cathode ray tube control circuit according to the invention.

An embodiment of the shadowmaskless tracking CRT circuit according to the invention, which is easy to implement is characterized in that the loop gain control means comprises an arithmetic means.

A further embodiment of the CRT circuit according to the invention is characterized in that the arithmetic means comprises a multiplier. The multiplier thus multiplies the tracking signal by the inverse value of the beam modulation signal, which beam modulation signal is the video signal.

A still further embodiment of the CRT circuit according to the invention is characterized in that the arithmetic means comprises a normalizer unit.

Contrary to the previously mentioned further embodiment, this still further embodiment does not use the video signal, which comes from outside the loop, inside the loop. Instead, it arithmetically manipulates its signals, in particular current signals in order to calculate an inverse beam modulation signal to reveal the beam modulation independent loop gain. Advantageously, the arithmetic calculations do not involve time and frequency-dependent features of said signals.

Another embodiment of the shadowmaskless tracking CRT control circuit is characterized in that the normalizer unit comprises an adder, a subtracter and/or a divider. These are components, which are easy to implement.

The present invention also relates to an image device, such as a monitor or television device comprising a shadowmaskless tracking cathode ray tube control circuit as defined in claims 1–5, in which the shadowmaskless tracking cathode ray tube control circuit comprises a control loop having a loop gain control means, which control loop is coupled to a shadowmaskless tracking cathode ray tube, said device being characterized in that the loop gain control means is arranged to compensate the loop gain of the control loop in dependence on the inverse value of a beam current in the shadowmaskless tracking cathode ray tube.

In addition, the present invention relates to a method of controlling the spot position in a shadowmaskless tracking cathode ray tube, which method is characterized in that the spot position is controlled in such a way that the control takes the inverse value of the beam current in the shadowmaskless tracking cathode ray tube into account.

BRIEF DESCRIPTION OF THE DRAWING

The shadowmaskless tracking CRT control circuit, the image device, such as a monitor or television device, and the method according to the invention will be elucidated, while reference is made to the appended drawing, wherein similar components are denoted by the same reference numerals. In the drawing.

DESCRIPTION OF THE PREFERRED EMBODIMENTS

Figure 1:
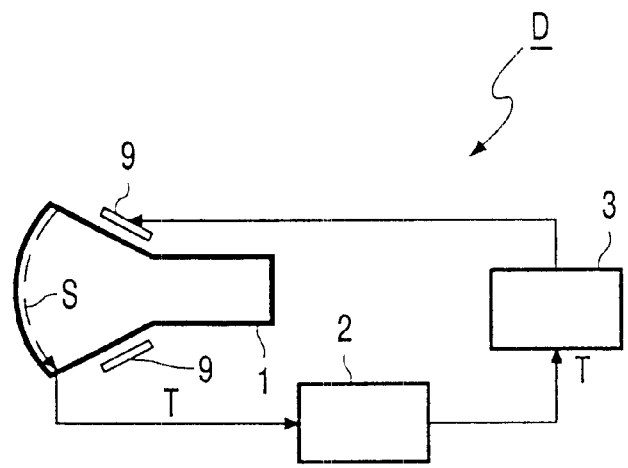
FIG. 1 shows schematically a part of an image device provided with a shadowmaskless tracking cathode ray tube, and a shadowmaskless tracking cathode ray tube control circuit.

FIG. 1 shows a diagram of a part of an image device D provided with a shadowmaskless tracking cathode ray tube, hereinafter referred to as CRT 1. The device D is provided with a coupling circuit 2 and a shadowmaskless tracking CRT control circuit 3 connected to the coupling circuit 2. The coupling circuit 2, which will not be further elucidated, couples a tracking signal T from the CRT 1 to the CRT control circuit 3. The CRT 1 is of a type which has no shadow mask, wherein the position of electron beams is measured by means of a conductive tracking or sensor structure S inside the CRT 1. When a spot is scanned along the tracks of the structure S, the tracking signal is generated and used in the shadowmaskless tracking CRT control circuit 3 of FIG. 2 for spot position correction purposes.

Figure 2:
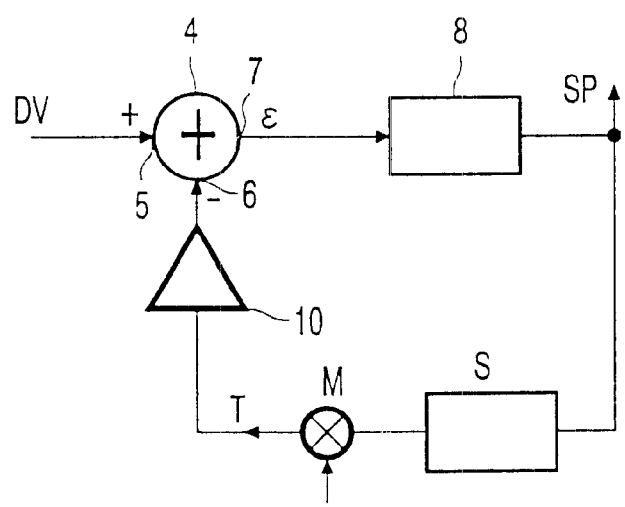
FIG. 2 shows schematically a shadowmaskless tracking cathode ray tube control diagram for implementing the method according to the present invention for use in the image device of FIG. 1.

FIG. 2 shows a schematic control diagram of the shadowmaskless tracking CRT control circuit 3 as is usual in the control theory for modeling the control process. Such a CRT control circuit 3 comprises a comparator 4 having a positive input 5 for an external desired spot position signal DV, a negative input 6 for a measured spot position signal and an error output 7 for generating an error signal E which equals the desired signal minus the measured or actual signal. The error signal is led to a deflection driver 8 for driving the deflection coils 9 around the neck of the CRT 1 so as to control the spot position on the CRT 1. The tracking sensor signal T which is derived from the tracking structure S comprises spot position information. However, the spot position information is also modulated by the beam current BC, which modulation is schematically shown in the control diagram of FIG. 2 by means of a modulator symbol M. As a consequence of this modulation, the loop gain for dark areas on the screen of the CRT 1 is lower than for brighter areas. Generally, a high loop gain is desired because of a corresponding high accuracy, viz. small error signal $\epsilon$ of the control loop. However, the control circuit will have a poor accuracy at low beam currents.

Therefore, the loop gain control means 10 are included in the shadowmaskless tracking CRT control circuit 3 and are coupled between the negative input 6 and the tracking sensor S. In this way, the measured spot position signal T is led through the means 10, which compensates the loop gain of the control loop in dependence on the inverse value of the beam current in the shadowmaskless tracking cathode ray tube 1. The beam current in fact forms the video information in the scene on the CRT 1. The favourable total effect is that the loop gain no longer depends on the beam current. Thus, an improved loop stability and/or loop accuracy balance can be chosen now.

The loop gain control means 10 may be embodied as an arithmetic means such as a multiplier or a normalizer. The tracking or sensor signal T can be represented in differential form by two currents:

$$i_1 = I_{beam}(½+\delta) \quad i_2 = I_{beam}(½-\delta) \tag{1}$$

where $I_{beam}$ is a measure of the beam current and $\delta$ is a measure of the spot position ($\delta=0$ means the spot is exactly on track). To construct the error signal $\epsilon$, only $\delta$ is of interest. It can easily be derived that:

$$i_1 - i_2 = 2I_{beam}\delta \tag{2}$$

and $$i_1 - i_2 = (i_1+i_2)2\delta \tag{3}$$

Both of the above formulas (2) and (3) yield the same result namely $2\delta$ after dividing $I_{beam}$ and $(i_1+i_2)$ respectively. (2 can be realized by the multiplier, which multiplies $i_1-i_2$ by the inverse value of $I_{beam}$. (3) can be realized by an analog adder for $i_1+i_2$, a subtracter and a divider for dividing $i_1-i_2$ by $i_1+i_2$. It is an advantage that the arithmetic calculations do not take time and frequency dependencies into account. Calculations based on formula (3) are normalizing calculations and only use tracking currents and no signal from another place in the image device, such as monitor or television device D.

What is claimed is:

1. A shadowmaskless tracking cathode ray tube control circuit (3) comprising a control loop having a loop gain control means (10), which control loop is coupled to the shadowmaskless tracking cathode ray tube (1), characterized in that the loop gain control means (10) is arranged to compensate a loop gain of the control loop in dependence on the inverse value of a beam current ($I_{beam}$) in the shadowmaskless tracking cathode ray tube (1).

2. A shadowmaskless tracking cathode ray tube control circuit (3) as claimed in claim 1, characterized in that the loop gain control means (10) comprises an arithmetic means (10).

3. A shadowmaskless tracking cathode ray tube control circuit (3) as claimed in claim 2, characterized in that the arithmetic means (10) comprises a multiplier (10).

4. A shadowmaskless tracking cathode ray tube control circuit (3) as claimed in claim 2, characterized in that the arithmetic means (10) comprises a normalizer unit (10).

5. A shadowmaskless tracking cathode ray tube control circuit (3) as claimed in claim 4, characterized in that the normalizer unit (10) comprises an adder, a subtracter and/or a divider.

6. An image device (D), such as a monitor or television device, comprising a shadowmaskless tracking cathode ray tube control circuit (3), in which the shadowmaskless tracking cathode ray tube control circuit (3) comprises a control loop having a loop gain control means (10), which control loop is coupled to a shadowmaskless tracking cathode ray tube (1), characterized in that the loop gain control means (10) is arranged to compensate the loop gain of the control loop in dependence on the inverse value of a beam current ($I_{beam}$) in the shadowmaskless tracking cathode ray tube (1).

7. A method of controlling a spot position in a shadowmaskless tracking cathode ray tube (1), characterized in that the spot position is controlled in such a way that the control takes the inverse value of a beam current ($I_{beam}$) in the shadowmaskless tracking cathode ray tube (1) into account.

* * * * *